United States Patent
Muhammad et al.

(10) Patent No.: US 7,822,389 B2
(45) Date of Patent: Oct. 26, 2010

(54) METHODS AND APPARATUS TO PROVIDE AN AUXILIARY RECEIVE PATH TO SUPPORT TRANSMITTER FUNCTIONS

(75) Inventors: Khurram Muhammad, Dallas, TX (US); Dirk Leipold, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 897 days.

(21) Appl. No.: 11/595,101

(22) Filed: Nov. 9, 2006

(65) Prior Publication Data

US 2008/0113628 A1 May 15, 2008

(51) Int. Cl.
*H04B 1/44* (2006.01)
(52) U.S. Cl. .............. 455/78; 455/73; 455/83; 455/84
(58) Field of Classification Search ............ 455/77, 455/631, 69, 78, 63.1, 73, 75, 76, 84–87, 455/313–315; 327/105; 375/269, 273, 279–281, 375/283, 308, 323, 329, 331
See application file for complete search history.

(56) References Cited

U.S. PATENT DOCUMENTS

| | | | |
|---|---|---|---|
| 4,291,277 A * | 9/1981 | Davis et al. | 330/149 |
| 5,835,850 A * | 11/1998 | Kumar | 455/67.14 |
| 6,915,112 B1 * | 7/2005 | Sutton et al. | 455/67.13 |
| 6,963,732 B2 | 11/2005 | Muhammad et al. | |
| 7,057,540 B2 | 6/2006 | Muhammad et al. | |
| 7,079,826 B2 | 7/2006 | Muhammad et al. | |
| 7,567,788 B2 * | 7/2009 | Newton et al. | 455/237.1 |
| 2002/0172170 A1 | 11/2002 | Muhammad et al. | |
| 2002/0177421 A1 | 11/2002 | Muhammad et al. | |
| 2003/0040294 A1 | 2/2003 | Staszewski et al. | |
| 2003/0050027 A1 | 3/2003 | Muhammad et al. | |
| 2003/0083033 A1 | 5/2003 | Staszewski et al. | |
| 2005/0130618 A1 | 6/2005 | Staszewski et al. | |
| 2005/0233725 A1 | 10/2005 | Muhammad et al. | |
| 2005/0283207 A1 * | 12/2005 | Hochmair et al. | 607/55 |

* cited by examiner

*Primary Examiner*—Duc Nguyen
*Assistant Examiner*—Dominic E Rego
(74) *Attorney, Agent, or Firm*—Wade J. Brady, III; Frederick J. Telecky, Jr.

(57) ABSTRACT

Methods and apparatus to provide an auxiliary receive path to support transmitter functions are disclosed. An example transceiver includes an antenna and a duplexer coupled to the antenna. A transmitter is coupled to the duplexer to output a transmit signal at a transmit frequency. A receiver is coupled to the duplexer to receive a received signal at a receiver frequency. A signal processor is coupled to the transmitter and receiver. An auxiliary receiver is communicatively coupled to the signal processor to receive the transmit signal output from the transmitter and send an auxiliary receiver signal to the signal processor. The signal processor adjusts the transmit signal based on the auxiliary receiver signal.

21 Claims, 7 Drawing Sheets

METHODS AND APPARATUS TO PROVIDE AN AUXILIARY RECEIVE PATH TO SUPPORT TRANSMITTER FUNCTIONS

FIELD OF THE DISCLOSURE

This disclosure relates generally to transceivers for wireless communication systems, and, more particularly, to methods and apparatus to provide an auxiliary receive path to support transmitter functions.

BACKGROUND

Low power wireless transceivers are used for a variety of applications such as cell phones, PDAs, tracking devices, etc. Such transceivers require the use of a duplexer and/or multiplexers to transmit and receive signals using a single antenna. To that end, the duplexer is coupled to an antenna, a receiver, and a transmitter. The duplexer passes signals having a first frequency received at the antenna to the receiver that processes such signals. Additionally, the transmitter sends transmit signals having a second frequency to the duplexer, which, in turn passes the transmit signals to the antenna for transmission. Many systems also include a digital baseband processor that processes inbound signals from the receiver and prepares outbound signals for transmission by the transmitter.

Some systems utilize transmitter signal refinement techniques that require a feedback loop to provide an indication of the signal being transmitted. For example, some systems utilize a feedback loop to facilitate the evaluation and correction of transmitter signal distortion. Such feedback loops are usually facilitated by the receiver. However, in full duplex operation mode, the receiver is completely utilized and, therefore, cannot be used to detect transmitter signal attributes that are useful in performing transmit transmitter signal refinement techniques (e.g., distortion control).

One solution to control and refine transmit signals (e.g., to control transmit signal distortion) has been calibration of the transmitter at the factory with calibration values stored in a memory used in normal operation. This approach is time intensive and increases the costs of development of transceiver designs. Additionally, this approach is not adaptive because the calibration values are stored in memory and are not typically changeable. Accordingly, the values used by the transceiver do not change with changing transceiver performance over time. In some situations, adjustments to precalibrated values are possible as a function of temperature, if the information about the temperature is available to the transmitter. In such a case, the temperature value is used to choose appropriate pre-distortion.

Another solution to controlling transmitter performance has been a feed-forward approach using computationally expensive methods such as look up tables or non-linear compensating functions. In another approach, transmitter feedback has been attempted by a power detector loop on the transmitter. However, a power detector loop does not contain any signal phase data and, thus, provides incomplete signal information for feedback and control purposes. In such a case, Cartesian feedback is applied with I/Q down-conversion, a loop filter, and a feedback inside the PA module. However, it is difficult to design such a system to house good stability and noise performance. Moreover, because such an approach is an analog approach, this approach is very susceptible to voltage, temperature and process variations. For example, the PA can pull the supply voltage as it is ramped, which complicates the design of these analog feedback circuits. Secondly, the noise introduced by the feedback path can make the use of this approach very limiting for cellular standards. Preamplifiers have also been used to attempt to refine the transmitter signals. However, the use of a preamplifer is limited due to noise and bandwidth issues from the transmitter.

DETAILED DESCRIPTION

Methods and apparatus to provide an auxiliary receive path to support transmitter functions and/or other diagnostics are disclosed. As described below in detail, the auxiliary receive path may receive its input from any number of different points in the transceiver. For example, the auxiliary receive path may be inductively coupled to an antenna. Alternatively, the auxiliary receive path may be directly coupled to receiver inputs from a duplexer, a diplexer, or other receive lineup filters to capture transmitter leakage or bleed through at the duplexer. Sufficient leakage RF signals are present in the front-end so as to create a large coupled signal at the input of the auxiliary receiver. In terms of its configuration, the auxiliary receive path may be self-contained and may produce an output coupled directly to a digital receiver. Alternatively, the auxiliary receive path may be coupled in part to the transceiver receive path (e.g., the main receiver) and may provide an input thereto. As described below, in such a configuration, the main receive path may perform certain functionality on the received signals, thereby eliminating the need for such functionality in the auxiliary receive path.

Figure 1:
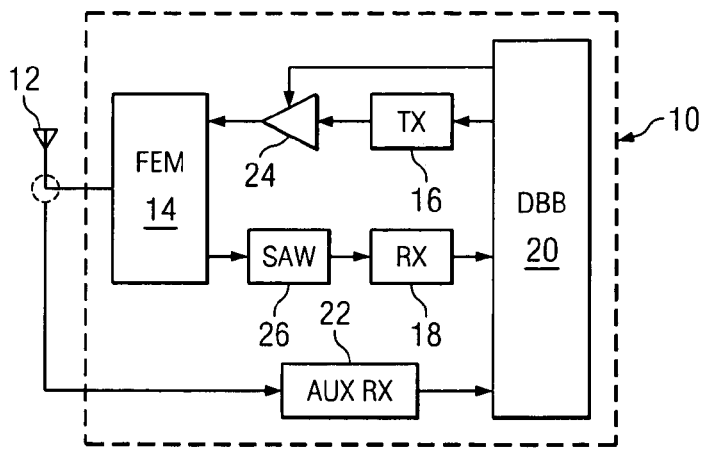
FIG. 1 is a block diagram of an example transceiver using an auxiliary receiver to support transmitter functions.

FIG. 1 is a block diagram of an example transceiver 10 having an antenna 12 coupled to a duplexer contained in a front end module (FEM) 14. In addition to a duplexer, the FEM 14 may contain SAW filters (for the transmitter and the receiver), as well as a power amplifier (PA) for the transmitter. Each band of operation may have dedicated SAW filters and a dedicated PA. Alternatively, the FEM 14 may include only the duplexer and may have the SAW filters and a PA external to the FEM, as shown in FIG. 1. The FEM 14 is coupled to a transmitter 16 and a main receiver 18, either directly if the FEM includes SAW filters or indirectly if external SAW filters are used. As shown in FIG. 1, the FEM 14 is coupled to a PA 24 and a SAW filter 26, or any other suitable type of filter module, to provide a portion of the receive path. The signals sent from the transmitter 16 and the signals received by the receiver 18 are processed by a digital baseband (DBB) processor 20 having various signal processing capabilities.

Those of ordinary skill in the art will understand that the DBB processor 20 may be any type of logic device and may be implemented using components such as a digital signal processor, memory devices, coder/decoders, application specific logic and/or with an accelerator connected to a processor. For example, the DBB processor 20 may be implemented using hard-coded logic or any other suitable processing device. Also, the DBB processor 20 may be configured to execute software and/or firmware instructions that are stored in a memory. In one example, signal processing functions performed on the feedback of the transmit signal can be partitioned between application specific hardware and firmware/software based on best flexibility, lowest power, and/or lowest implementation cost.

The transmitter 16 sends signals to the PA 24, which sends signals at a transmit frequency to the antenna 12 through the FEM 14. In the receive direction, the FEM 14 receives signals from the antenna 12 at a receive frequency, which differs from the transmit signal frequency. The received signals from the FEM 14 are filtered by a filter module 26 (e.g., a SAW filter module) that filters signals at the receive frequency and passes the filtered signals to the main receiver 18.

In this example, the main receiver 18 may receive signals at a low band frequency, a middle band frequency and a high band frequency. Depending on the application and on the type of receiver construction, more bands may be processed by independent low noise amplifiers (LNAs) or by using fewer LNAs than the supported bands, with each LNA supporting multiple bands. In the extreme case, a single-wideband LNA may support all frequency bands of interest. The transmitter 16 can transmit signals at a low band frequency, a middle band frequency and a high band frequency. A similar scenario explained for the receiver LNAs can be used for the transmitter.

An auxiliary receiver 22 is coupled to the DBB processor 20 and receives indications (e.g., attenuated versions) of signals generated by the transmitter 16 and feeds such back to the DBB processor 20 for assistance in transmitter signal adjustment and refinement. As explained below, the auxiliary receiver 22 is tuned to and processes signals at the transmit frequency and provides the same to the DBB processor 20 so that the same can be processed to perform various transmitter signal adjustment and refinement functions. For example, the output signal of the auxiliary receiver 22 may be processed by the DBB processor 20 to perform power detection to determine the power of the transmitter signal in order for the digital baseband processor 20 to control transmitter power output. The output signal of the auxiliary receiver 22 may also be processed to control the boost of the transmitter signal, which may be processed to obtain an absolute power value when the power of the transmitter signal is ramped up. The magnitude of the complex output of the auxiliary receiver 22 reflects the transmitter output power so that the output from the transmitter can be calibrated. Additionally, the output signal of the auxiliary receiver 22 may be used by the DBB processor 20 to linearize the signal transmitted from the transmitter 16 by determining a transmitter distortion function from the signal received from the auxiliary receiver 22. In such an arrangement, the DBB processor 20 may apply an inverse distortion function dictated by the transmitter distortion function and use the pre-amplifier 24 or other hardware in the receive path signal processing circuitry to apply the inverse distortion function to linearize the output signal from the transmitter 16.

Figure 2:
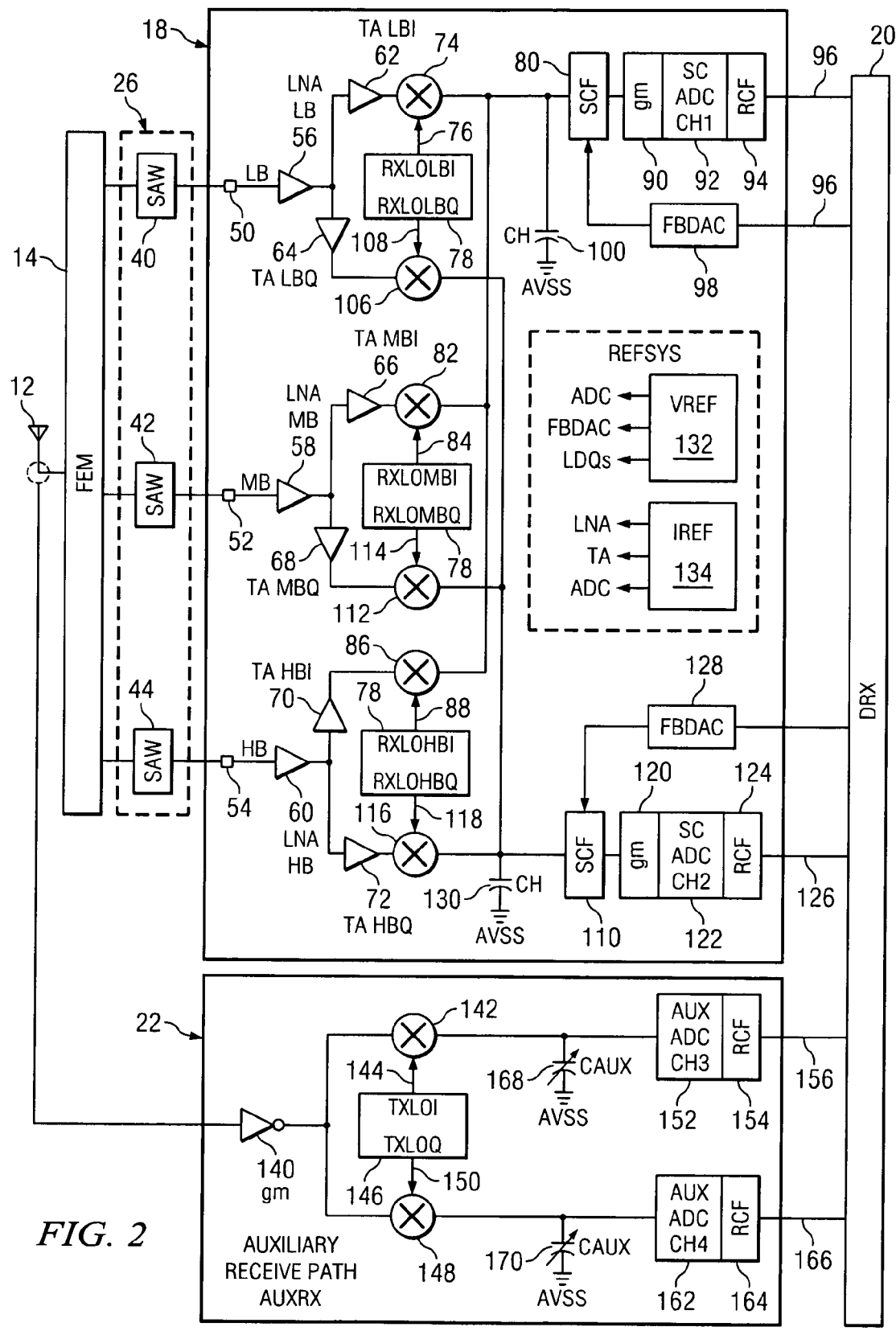
FIG. 2 is a schematic diagram of an example receiver and auxiliary receiver arrangement for use in the example transceiver in FIG. 1 using separate channels for the auxiliary receiver output to the signal processor.

FIG. 2 shows an example implementation of the receiver 18 and the auxiliary receiver 22 in conjunction with the filter module 26 of FIG. 1. In one example, the receiver 18 and the auxiliary receiver 22 are separate components, such as separate integrated circuits, though this need not be the case. Example implementations of the receiver 18 are described in U.S. Pat. No. 7,079,826 entitled "Digitally controlled analog RF filtering in subsampling communication receiver architecture," U.S. Pat. No. 7,057,540 entitled "Sigma-delta analog-to-digital converter (ADC) structure incorporating a direct sampling mixer," U.S. Pat. No. 6,963,732 entitled "Subsampling communication receiver architecture with relaxed IFA readout timing", U.S. Publication No. 20050233725 entitled "Image reject filtering in a direct sampling mixer," U.S. Publication No. 20050130618 entitled "Sampling mixer with asynchronous clock and signal domains," U.S. Publication No. 20030083033 entitled "Sampling mixer with asynchronous clock and signal domains," U.S. Publication No. 20030050027 entitled "Digitally controlled analog RF filtering in subsampling communication receiver architecture," U.S. Publication No. 20030040294 entitled "Efficient charge transfer using a switched capacitor resistor," U.S. Publication No. 20020177421 entitled "Subsampling communication receiver architecture with gain control and RSSI generation," and U.S. Publication No. 20020172170 entitled "Spread spectrum demodulation using a subsampling communication receiver architecture." Each of these patents and publications are incorporated herein by reference.

FIG. 2 also shows circuitry associated with low, middle and high band reception and processing. A preamplifier/LNA or a transconductance amplifier (V-I converter) is followed in the auxiliary path by quadrature down-conversion mixers that are operated by the appropriate TX local oscillator. Therefore, for the three bands of operation shown, the correct LO is applied to the down-conversion mixers by multiplexing it to the mixers. The LO is shared between the TX and the auxiliary receive path such that Zero-IF direct-conversion occurs at the mixer output. The mixed down signal is converted from analog-to-digital and digitally post-processed in the receiver for feeding back to the transmitter. Implementations described in the above references describe such V-I conversion followed by direct sampling on the capacitors CAUX 168 and 170 through the mixer. CAUX 168 and 170, together, constitute a differential capacitor.

As shown in FIG. 2, the preamplifier in the auxiliary path may be a transconductance stage that drives the input of an A/D converter through the mixer and capacitors 168 and 170. The transconductance stage converts input voltage to a current and couples the current to the capacitors 168, 170, thereby creating a low-pass filter, more precisely, a lossy integrator. The principle of such down-conversion operation is described in detail in the cited references. The value of CAUX may be programmable and used as a part of the loop filter or as an anti-aliasing filter for the ADC. In the receiver, digital signal processing functions are applied before feeding back the signal to the transmitter.

The FEM 14 sends received signals to the filter module 26. The filter module 26 includes a low band SAW filter 40, a middle band SAW filter 42, and a high band SAW filter 44. The example receiver 18 has a low band input 50, a middle band input 52, and a high band input 54. The low band input 50 is coupled to the output of the low band SAW filter 40. The middle band input 52 is coupled to the output of the middle band SAW filter 42. The high band input 54 is coupled to the output of the high band SAW filter 44. It is to be understood by those of ordinary skill in the art that other types of filters may be used to filter the different receiver frequency bands. Moreover, more or less frequencies or bands of frequencies may be received by the receiver 18.

The low band input 50, the middle band input 52 and the high band input 54 are coupled to respective low noise amplifiers 56, 58, and 60. The output of the low noise amplifier 56 for the low band input 50 is coupled to a pair of amplifiers 62 and 64 to facilitate in-phase (I) and quadrature (Q) processing, thereby constituting a quadrature down-conversion mixer. Similarly, the output of the low noise amplifier 58, for the middle band input 52, is coupled to a pair of I and Q amplifiers 66 and 68, and the output of the low noise amplifier 60 for the high band input 54 is coupled to a pair of I and Q amplifiers 70 and 72.

The output of the amplifier 62 coupled to a mixer 74 and is mixed with a low band local oscillator (LO) channel input 76 provided by an LO 78 and produces an output that is coupled to a switched capacitor filter 80. Similarly, the output of the amplifier 66 is mixed via a mixer 82 with a middle band local oscillator I-channel input 84 from the local oscillator 78 and the output of the amplifier 70 is mixed via a mixer 86 with a high band local oscillator I-channel input 88 from the local oscillator 78. Both of these signals are also coupled to the switched capacitor filter 80 that processes the I-channel signals.

The output of the switched capacitor filter 80 is coupled to a gain amplifier 90, which is coupled to an analog to digital converter (ADC) 92 that converts the amplified analog signal into a digital signal. The output of the ADC 92 is coupled to a reconstructive filter 94, the output of which is coupled to the digital baseband processor 20 via a receiver I-band channel 96. The reconstructive filter 94 may be needed if the ADC 92 is implemented as an oversampling sigma-delta converter and is used to reduce the output data rate to lower value without aliasing noise in the band of interest. In one implementation the reconstructive filter 94 is implemented as cascaded-integrator comb filters, although many alternatives exist for constructing such filters including non-recursive FIR and recursive IIR filters. The digital baseband processor 20 outputs a digital feedback signal, which is coupled to a digital to analog converter (DAC) 98. The output of the DAC 98 is coupled to the switched capacitor filter 80. The DAC 98 serves to control the common mode voltage of the SCF 80.

The output of the amplifier 64 is mixed via a mixer 106 with a low band LO Q-channel input 108 from the local oscillator 78 and is coupled to a switched capacitor filter 110. Similarly, the output of the amplifier 68 is mixed via a mixer 112 with a middle band LO Q-channel input 114 from the local oscillator 78 and the output of the amplifier 72 is mixed via a mixer 116 with a high band LO Q-channel input 118 from the local oscillator 75. The mixed outputs of the amplifiers 64, 68, and 72 are coupled to the switched capacitor filter 110, which processes the Q-channel signals.

The output of the switched capacitor filter 10 is coupled to a gain amplifier 120. The output of the gain amplifier 120 is coupled to an ADC 122, which converts the input analog signal into a digital signal. The output of the ADC 122 is coupled to a reconstructive filter 124, the output of which is sent to the digital signal processor 20 via a receiver Q-channel 126. The digital baseband processor 20 outputs a feedback signal that is coupled to a DAC 128, which is coupled to the switched capacitor filter 110. A decoupling capacitor 130 is provided between the input of the switched capacitor filter 110 and ground to smooth the input signal to the switched capacitor filter 110.

The switched capacitor filters 80 and 110 are adjusted to filter the low band, middle band and/or high band signals provided by the mixers 74, 82, 86, 106, 112 and 116. While the example shows an implementation in which a single band is processed at one time, other implementations are possible that process several bands at the same time. A voltage reference source 132 and a current reference source 134 provide reference voltage and currents to the various components in the receiver 18.

The auxiliary receiver 22 of FIG. 2 is inductively coupled to the antenna 12 to receive signals from the transmitter 16 in FIG. 1 that are broadcast from the antenna 12. However, inductive coupling is not the only manner in which the auxiliary receiver 22 may obtain its input, other coupling techniques may be used. Another type of coupling that may be used is electrical coupling using a controlled impedance that would appear as a parallel path to the main signal path in the main receiver. By making the impedance looking into the auxiliary path through this coupler large compared to the impedance looking into the main receiver, small or insignificant loss in signal power is incurred. In the auxiliary receiver 22, the antenna signal is coupled to a gain amplifier 140, the output of which is mixed via a mixer 142 with a LO transmitter I-channel input 144 of a LO 146 resulting in a baseband I-channel signal. The output of the gain amplifier 140 is also mixed via a mixer 148 with a LO Q-channel transmitter input 150 from the local oscillator 146 resulting in a baseband Q-channel signal.

The auxiliary receiver 22 samples the RF signal through the mixer switch on the sampling capacitor CAUX 142 and 148 (which can together be viewed as a differential capacitor). An IIR filter is created because of the charge loss due to the switching of the mixer and the charge accumulated on the sampling capacitor through the "lossy integrator" operation described earlier and in detail in the included references.

The baseband I-channel signal is coupled to an ADC 152 that has an output coupled to a reconstructive filter 154. The reconstructive filter 154 sends the digital I-channel signal via an auxiliary receiver I-channel 156 to the digital baseband processor 20. The baseband Q-channel signal is coupled to an ADC 162, the output of which is coupled to a reconstructive filter 164. The reconstructive filter 164 sends the digital Q-channel signal via an auxiliary receiver Q-channel 166 to the digital baseband processor 20. Two adjustable capacitors 168 and 170 allow the refining of the I-channel and Q-channel signals. The LO 146 allows tuning of the I-channel and Q-channel signals to the transmitter low band, middle band, and high band frequencies via the mixers 142 and 148. The received I-channel signal and Q-channel signal on the auxiliary receiver channels 156 and 166 may be used by the digital baseband processor 20 to support the transmitter signal refinement functions as described above.

The auxiliary receiver 22 is operated by the transmitter LO of the operating band. Therefore TXLO in FIG. 2 represents the transmitter LO for the low-band, if the low-band transmitter is operating, the transmitter LO for the mid-band, if the mid-band transmitter is operating and the transmitter LO of the high-band, if the high-band is operating. This can be realized through many ways, one of which is to use a multiplexer that chooses the appropriate transmitter LO based on the operating band.

It is to be understood by those of ordinary skill in the art that the components on the receiver 18 and/or the auxiliary receiver 22 may be separate integrated circuits or combinations of separate integrated circuits, or the receiver 18 and the auxiliary receiver 22 may be one circuit component. For example, an optional signal path may be established to allow the use of the ADCs 92 and 122 in the receiver 18 by the auxiliary receiver 22 by using multi-channel ADCs for the ADCs 92 and 122.

Figure 3:
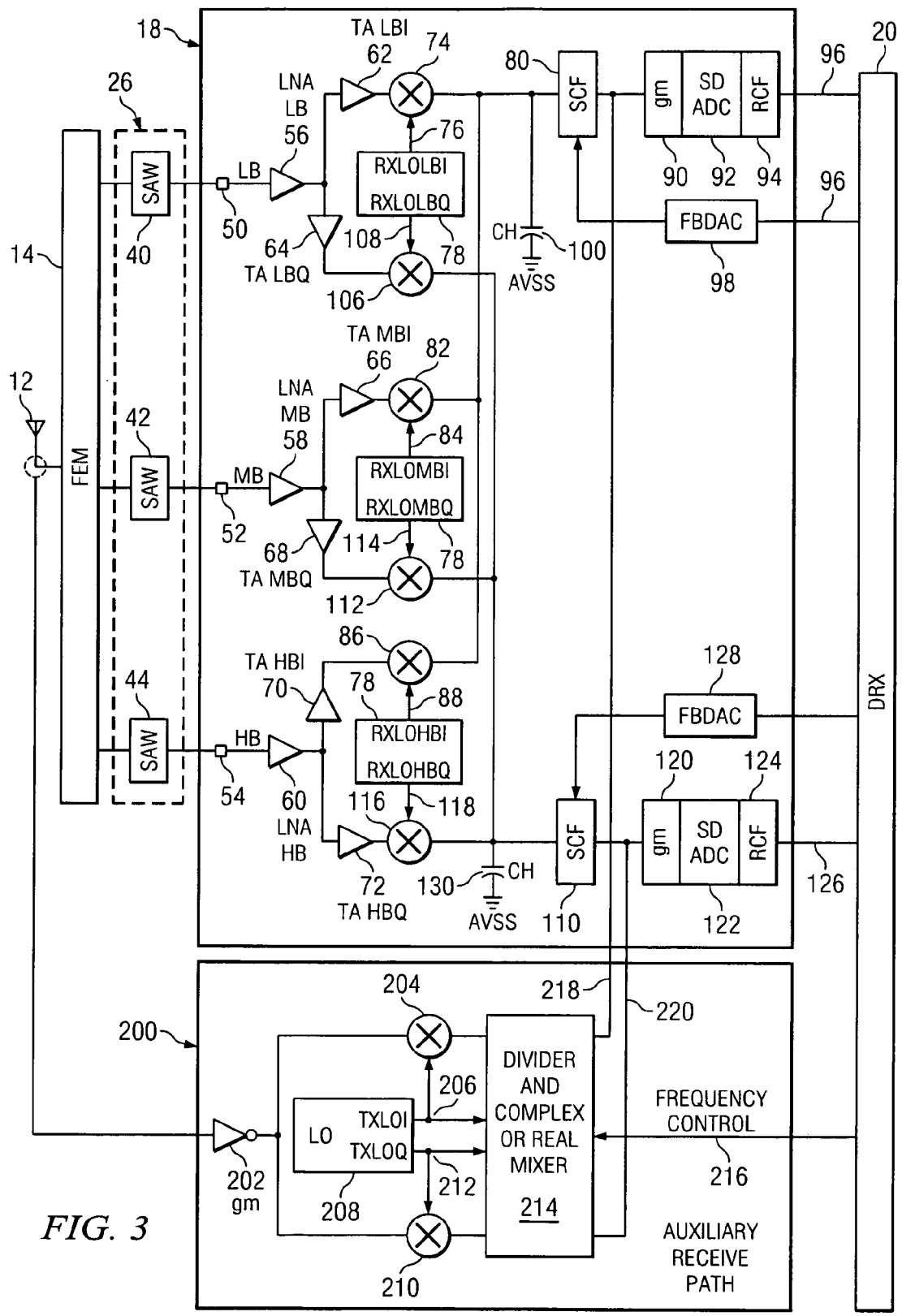
FIG. 3 is a schematic diagram of another example receiver and auxiliary receiver arrangement for use in the example transceiver in FIG. 1 using the receiver channels for the auxiliary receiver output to the signal processor.

FIG. 3 is an alternate configuration of the receiver 18 in FIG. 2 and an auxiliary receiver 200, which allows the receiver 18 and auxiliary receiver 200 to share the same channel inputs to the digital baseband processor 20. In FIG. 3, the example antenna 12, FEM 14, receiver 18 and filter module 26 and their components are identical or substantially identical to their respective counterparts and components in FIGS. 1 and 2 and thus have identical element names and reference numbers. The auxiliary receiver 200 replaces the auxiliary receiver 22 in FIG. 1.

The auxiliary receiver 200 in FIG. 3 is inductively coupled to the antenna 12 to receive signals from the transmitter 16 in FIG. 1. The signal from the antenna 12 is coupled to a gain amplifier 202, which has an output that is passed to a mixer 204 that mixes the signal with a LO transmitter I-channel input 206 provided by a local oscillator 208. The output of the gain amplifier 202 is also mixed with a mixer 210 with a LO Q-channel input 212 from the LO 209. The baseband signals from the mixers 204 and 210 are input into a divider and mixer circuit 214. The divider and mixer circuit 214 receives a frequency control input 216 from the digital baseband processor 20, which determines an intermediate frequency (IF) that is an integer divided frequency of a local oscillator of the transmitter 16. The intermediate frequency is selected in order not to add significant noise to the receiver signal sent to the DBB processor 20, because, in this example, the ADC of the main receive path is reused to digitize the signal from the auxiliary receive path. The two signals are kept separate by frequency-division-multiplexing.

The auxiliary receiver 200 converts the baseband I and Q channel signals from the transmitter 16 by two stage mixing. The quadrature down-conversion mixer operated by the transmitter LO first down converts the baseband I and Q channel signals to Zero-IF. The divider and mixer circuit 208 then mixes the baseband signal with an intermediate frequency to convert the baseband I and Q channel signals to the intermediate frequency. The IF frequency is obtained from the receiver LO by the dividers in the divider and mixer circuit 208. The mixers in the dividers in the divider and mixer circuit 208 use the output of the dividers to mix the baseband signal to the IF frequency. The composite signal entering into the I and Q A-D conversion systems (90, 92, 94 and 120, 122 and 124) which see the main received signal close to Zero-IF or at low-IF for the main receive path and the TX feedback signal at the selected IF frequency by the divider and mixer circuit 208.

The divider and mixer circuit 214 has an I-channel output 218 that is coupled to the gain amplifier 90 and the ADC 92 in the receiver 18. The divider and mixer circuit 214 also has a Q-channel output 220 which is coupled to the gain amplifier 120 and ADC 122 in the receiver 18. In this manner, the digital baseband processor 20 receives a combined I-channel signal including the signal from the receiver 18 and the signal representing the output signal from the transmitter 16 via the auxiliary receiver 200 on the receiver I-channel 96. The digital baseband processor 20 also receives a combined Q-channel signal including the signal from the receiver 18 and the signal representing the output signal from the transmitter 16 via the auxiliary receiver 200 on the receiver Q-channel 126. By further signal processing, the digital baseband processor 20 can isolate the transmitter output signals from the combined signals on the receiver channels 96 and 126 and use the signal data relevant to the transmitter to perform transmitter functions as described above.

Figure 4:
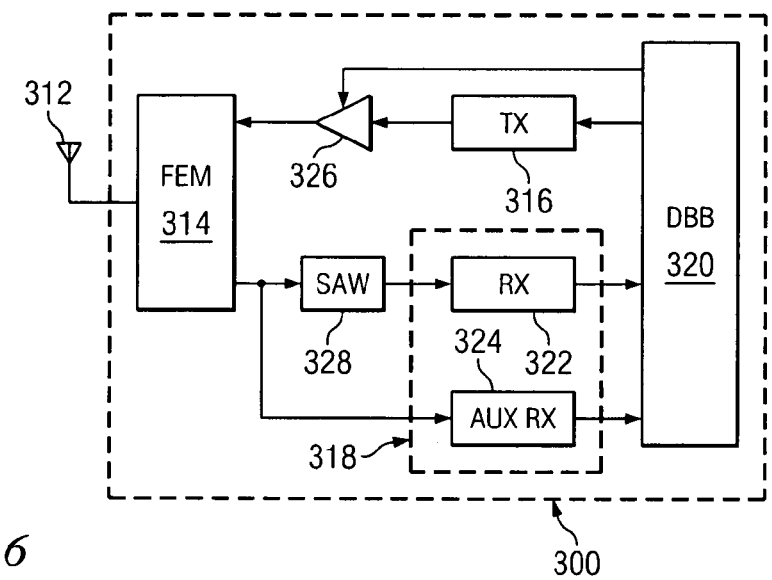
FIG. 4 is a block diagram of another example transceiver using an auxiliary receiver receiving signals from a receiver to support transmitter functions.

FIG. 4 is a block diagram of another example transceiver 300 having an antenna 312 coupled to a FEM 314. The FEM 314 is coupled to a transmitter 316 and a receiver module 318. The signals sent through the transmitter 316 and received by the receiver module 318 are processed by a DBB processor 320 with various components for signal processing. In this example, the receiver module 318 includes a receiver 322 and an auxiliary receiver 324, which may be implemented together in a circuit component. Those of ordinary skill in the art will understand that the receiver 322 and the auxiliary receiver 324, or any part thereof, may be separate components.

In the receive path, the FEM 314 receives signals at a receive frequency which differs from the transmit frequency. The auxiliary receiver 324 is coupled to the DBB processor 320 and receives bleed signals via the receiver 322 which are an indication of the signal transmitted by the transmitter 316. The DBB processor 320 uses the signals from the auxiliary receiver 324 for assistance in transmitter signal adjustment and refinement as explained above. The transmitter 316 sends signals to a power amplifier 326, which sends signals at a transmit frequency through the FEM 314. The output stage of the transmitter 316 is generally a pre-power amplifier stage that drives the power amplifier 326 The received signals are filtered by a filter module 328, which filters signals at the receive frequency to the receiver. In this configuration, the auxiliary receive path 324 receives the signal from the output of the FEM 314.

Figure 5A:
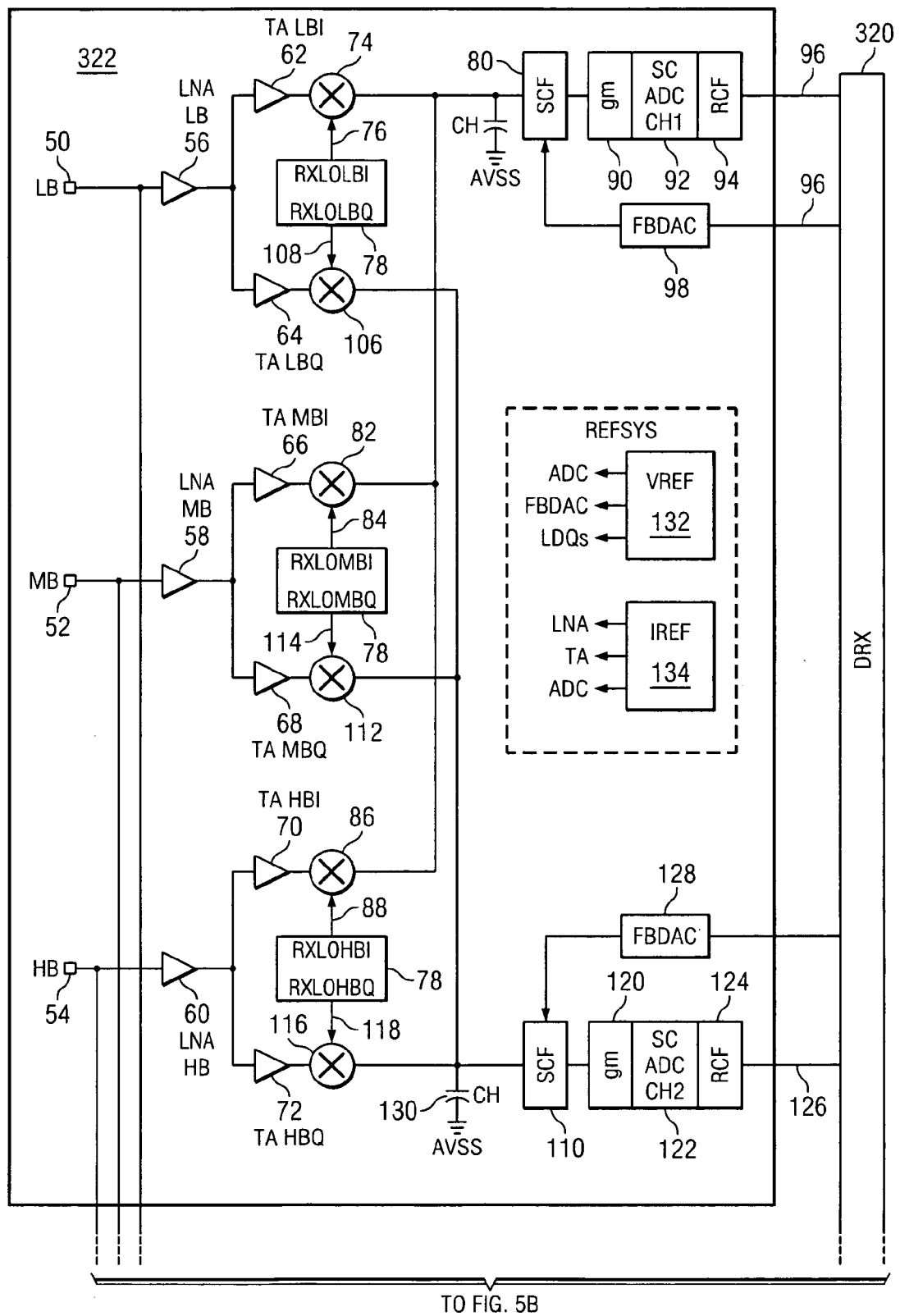
FIG. 5 is a schematic diagram of an example receiver and auxiliary receiver arrangement for use in the example transceiver in FIG. 4.
Figure 5B:
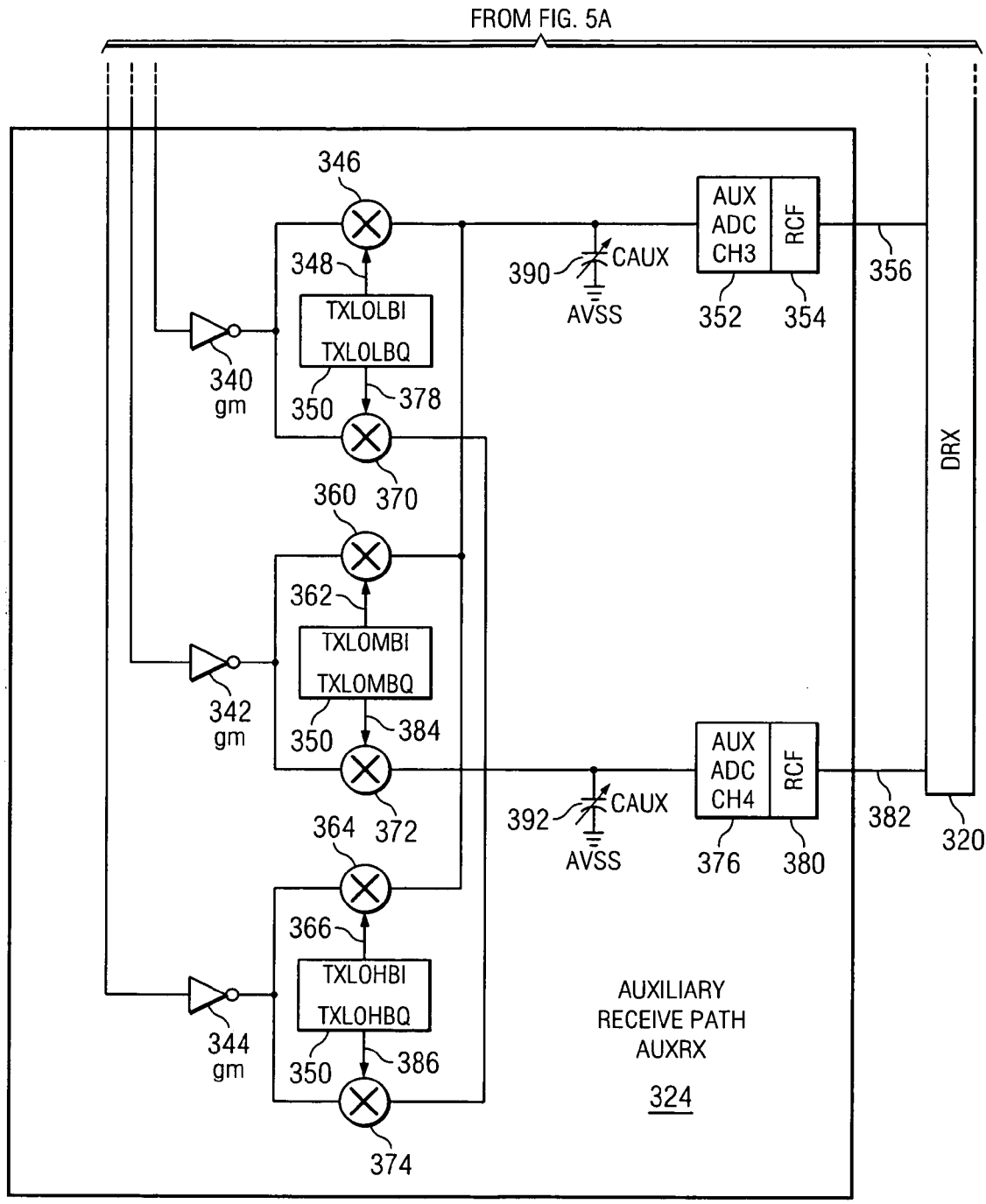

FIG. 5 shows an example configuration for the auxiliary receiver 324 and the receiver 322 in the example receiver module 318 of FIG. 4. The receiver 322 may be substantially identical to the receiver 18 in FIG. 2 and, thus, has identical element names and reference numbers for identical components. Because the components and the operation of the receiver 322 have been previously described, for the sake of clarity, the same description will not be duplicated. Thus, the following description focuses on the components and operation of the auxiliary receiver 324.

As shown in FIG. 5, the auxiliary receiver 324 receives the low band input 50, which may receive signals from filters or any other suitable upstream components, at an input of a gain amplifier 340. Similarly, the middle band input 52 is coupled to the input of a gain amplifier 342 in the auxiliary receiver 324 and the high band input 54 is coupled to the input of a gain amplifier 344 in the auxiliary receiver 324. The auxiliary receiver 324 is tuned to receive the transmit frequency, thus the output of the gain amplifier 340 is mixed via a mixer 346 with a low band transmitter frequency local oscillator I-channel input 348 from a local oscillator 350 and is coupled to an analog to digital converter (ADC) 352. The ADC 352 is coupled to a reconstructive filter 354 and feeds the I-channel signal to the digital baseband processor 320 via an auxiliary receiver channel 356. In a similar manner, the output of the gain amplifier 342 is mixed via a mixer 360 with a middle band transmitter frequency local oscillator I-channel input 362 from the local oscillator 350 and is coupled to the analog to digital converter (ADC) 352. Also, the output of the gain amplifier 344 is mixed via a mixer 364 with a high band transmitter frequency local oscillator I-channel input 366 from the local oscillator 350 and is coupled to the ADC 352. Thus, the in-phase components of the transmit signal are selectively tuned for reception in each of the low, middle and high bands and the results of the tuning are provided to the ADC 352.

The quadrature components are also down-converted by mixers 370, 372 and 374 and provided to an ADC 376. In particular, the output of the gain amplifier 340 is mixed via the mixer 370 with a low band transmitter frequency local oscillator Q-channel input 378 from the local oscillator 350 and is coupled to the ADC 376. The ADC 376 is coupled to a reconstructive filter 380 and feeds the Q-channel signal to the digital baseband processor 320 via an auxiliary receiver channel 382. In a similar fashion, the output of the gain amplifier 342 is mixed via the mixer 372 with a middle band transmitter frequency local oscillator Q-channel input 384 from the local oscillator 350 and is coupled to the ADC 376. The output of the gain amplifier 344 is mixed via the 374 with a high band transmitter frequency local oscillator Q-channel input 386 from the local oscillator 350 and is coupled to the ADC 376. Thus, the quadrature components of the transmit signal are selectively down-converted for reception in each of the low, middle and high bands and the results of the tuning are provided to the ADC 376.

Two adjustable capacitors 390 and 392 allow the refining of the outputs of the amplifiers 340, 342 and 344 at the low band, middle band or high band transmitter frequencies. A bleed signal from the signal output by the transmitter 316 is received by the receiver 322 due to the transient energy bleeding through the FEM 314 or any other circuitry that separates the transmitter 316 from the receiver 322. The bleed signal is part of the receiver signal received on the receiver inputs 50, 52 and 54 and because the bleed signal is at the transmitter frequency, the bleed signals are selected and processed by the auxiliary receiver 324 and sent via the channels 356 and 382 for processing by the digital baseband processor 320 as an indication of the signal from the transmitter 316 in FIG. 4.

It is to be understood that the different configurations in FIGS. 2-5 may be interchanged. For example, instead of using multiple channels to the digital baseband processor, the receiver channels alone may be used for a combined receiver and auxiliary receiver signal as shown in FIG. 3.

The single gain amplifier configuration of the auxiliary receiver 18 in FIG. 2 may be used instead of the multiple gain amplifier configuration of the auxiliary receiver 324 in FIG. 5. In such a configuration the inputs 50, 52 and 54 of the receiver 322 may be coupled to the single gain amplifier of the auxiliary receiver 20 in FIG. 2 instead of the antenna 12. The single gain amplifier auxiliary receiver 22 may be a single component with the receiver 18. Alternatively, the multiple gain amplifier configuration of the auxiliary receiver 324 in FIG. 5 may be used for the single gain auxiliary receiver 18 in FIG. 2. The inputs of the multiple gain amplifiers may be inductively connected to the antenna as in FIG. 2. Alternatively, the inputs may be taken from the receiver inputs 50, 52 and 54 and the proper frequency may be filtered by adjusting the local oscillator. The receiver 18 and the substituted auxiliary receiver may be a single component.

The auxiliary receiver 200 in FIG. 3 is shown as a separate component from the receiver 18. However, it is to be understood that the auxiliary receiver 200 may be integrated into a single component with receiver 18. Further, the auxiliary receiver 200 may be coupled to the receiver inputs 50, 52 and 54 to receive the bleed signal from the transmitter.

Figure 6:
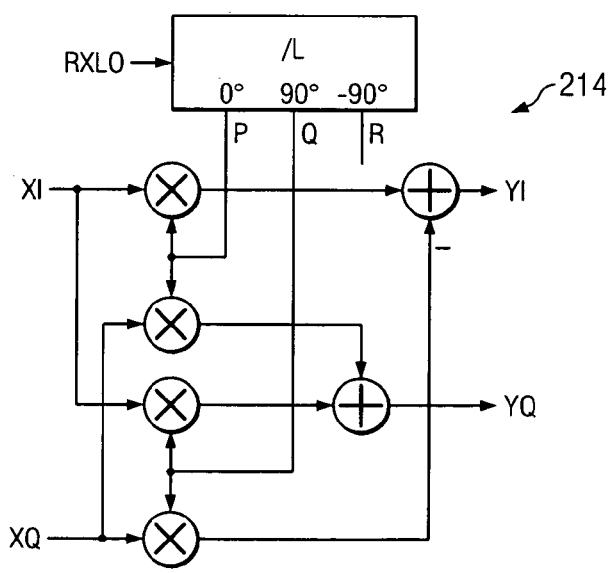
FIG. 6 is a diagram of an image reject mixer used for sharing ADC between the main and the auxiliary receive path.

FIG. 6 shows the details of the divider and mixer circuit 214 of FIG. 3. The RXLO is divided by an integer L to obtain the in-phase and quadrature components of the second IF frequency that is used to up-convert the TX feedback signal for the purpose of sharing the same ADC between the main RX path and the auxiliary RX path. It is possible for the divider to implement a fractional division such that L represents an integer and a fractional part. This could be done to spread the contents of the clock over a wider band to avoid creating spurs in the system. In the signal processing path, the transmit signal is recovered from the composite signal by a second down-conversion that is driven by the same IF frequency. The signals P and Q are shown to be used by the divider and mixer circuit 214 and signals P and R will be used by a second quadrature mixer in the receive path signal processing to translate the TX feedback signal back to Zero-IF, where it can be separated from the receive signal through a lowpass filter.

It is also possible to spread the TX feedback signal using a PN sequence generator instead of the divider in the divider and mixer circuit 214. In this case, the TX feedback signal is mixed to a wideband signal using a PN sequence. The signals P and Q will, in this case, be generated using a PN sequence generator and will be orthogonal to each other. In the receiver signal processing circuits, the same PN sequence is used to despread the TX feedback signal. This allows placing the TX feedback signal below the noise floor of the RX signal and has the advantage that it can be centered now at Zero-IF where a sigma-delta ADC has highest dynamic range.

Figure 7:
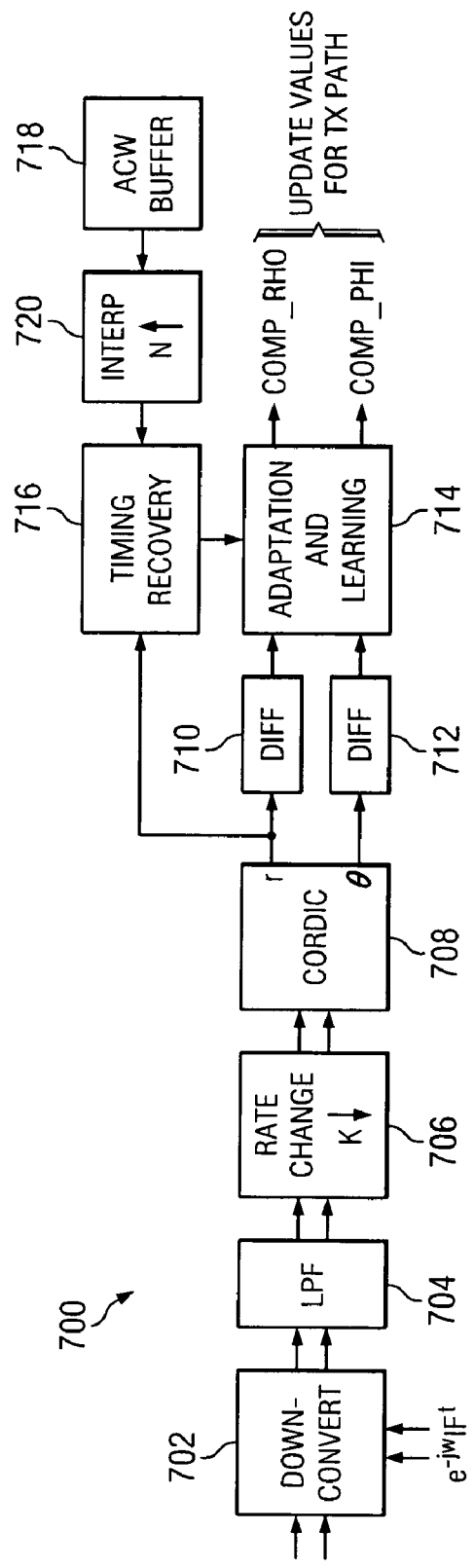
FIG. 7 is a diagram of receive path processing to allow closed loop operation that is needed for linearization of the transmitter output.

FIG. 7 shows a drawing of the example receive signal processing 700 used for processing of the TX feedback signal. If the auxiliary receive path uses up-conversion of the feedback signal to an IF frequency, a first stage 702 down-converts this signal to Zero-IF. If the auxiliary receiver spreads it using a PN sequence, then a despreader is needed as the first stage to extract the TX feedback signal for further processing. It may also be possible that the main receive path implements low-IF down conversion, in which case, the TX feedback signal from the auxiliary receive path may be kept at Zero-IF and is not up-converted before feeding into the ADC. If the ADC is not shared, as in FIG. 2 and FIG. 6, then the TX feedback signal is directly applied to the system shown in FIG. 7 and no down-conversion is needed. In such a case, the first stage in the system shown in FIG. 7 may be bypassed. A low pass filter (LPF) 704 is used to filter out high frequency noise prior to post-processing of this signal in order to band limit the noise. This will be especially the case if the ADC used uses sigma-delta modulation to shape the quantization noise. In some cases, no LPF may be used, if the LPF increases the latency of the feedback path significantly and reduces the phase margin.

Generally, the ADC is implemented using over-sampling and produces a high output rate. It may be necessary to reduce the data rate further by down-sampling the output to a suitable rate using an anti-aliasing filter followed by a down-sampler by K 706. One reason for this choice will be to reduce the current consumption of the following digital blocks. A CORDIC engine 708 converts the TX feedback signal from Cartesian representation to polar representation. This would be used, if the TX is constructed using a polar approach and the feedback is applied to the transmitter in polar domain.

Self-mixing in the auxiliary mixers create DC offsets in the TX feedback signal that need to be eliminated. One approach is to estimate and subtract the DC as an initialization. A second approach is shown in FIG. 7 and consists of passing the TX feedback signal through a differencer $(1-z^{-1})$ 710, 712 that generates differences between consecutive RX samples instead of the absolute values. These differences indicate jumps in the amplitude and phase of the TX output as seen through the receiver as the TX output is changed. A learning and adaptation engine 714 uses these and compares with the jumps in the input applied at the TX input (in amplitude and phase) to obtain the error in the amplitude and phase. These error signals are required to be driven to zero in order for the TX output to be a replica of the TX input.

The adaptation and learning engine 714 computes average error signal and computes the correction needed to be applied to the transmitter input such that the error signal is forced to zero in a mean-square or a least-squares sense. Many optimization approaches may be applied to construct such a system that operates this feedback system to force the error signal to zeros in a mean-square or a least-square sense. One example is to use an LMS algorithm.

The timing Recovery 716 in FIG. 7 performs "symbol timing recovery" so that the input to the adaptation and learning block can be associated with the corresponding TX input because the latency of the path is unknown due to analog blocks in the path. The delays can change with process and temperature. The error signal can only be computed if a transmitter input is compared with the corresponding correct receiver output. The ACW buffer 718 stores the transmitter input in a buffer and this data is upsampled by a factor N 720 such that the sample rates at the CORDIC 708 output is the same as the sample rate at the output of this upsampler 720. This allows convenient comparison of the TX output with the corresponding output observed in the auxiliary receiver. Without timing recovery, the adaptation and learning algorithm cannot compute the correct error signal for the amplitude and phase for the applied input to the transmitter. Of course, the loop gain from the TX-input to the receiver output must first be calculated and calibrated. This is necessary in order to compute the correct magnitude of the observed error signal (COMP_RHO and COMP_PHI, i.e. compensation for amplitude and compensation for phase).

Figure 8:
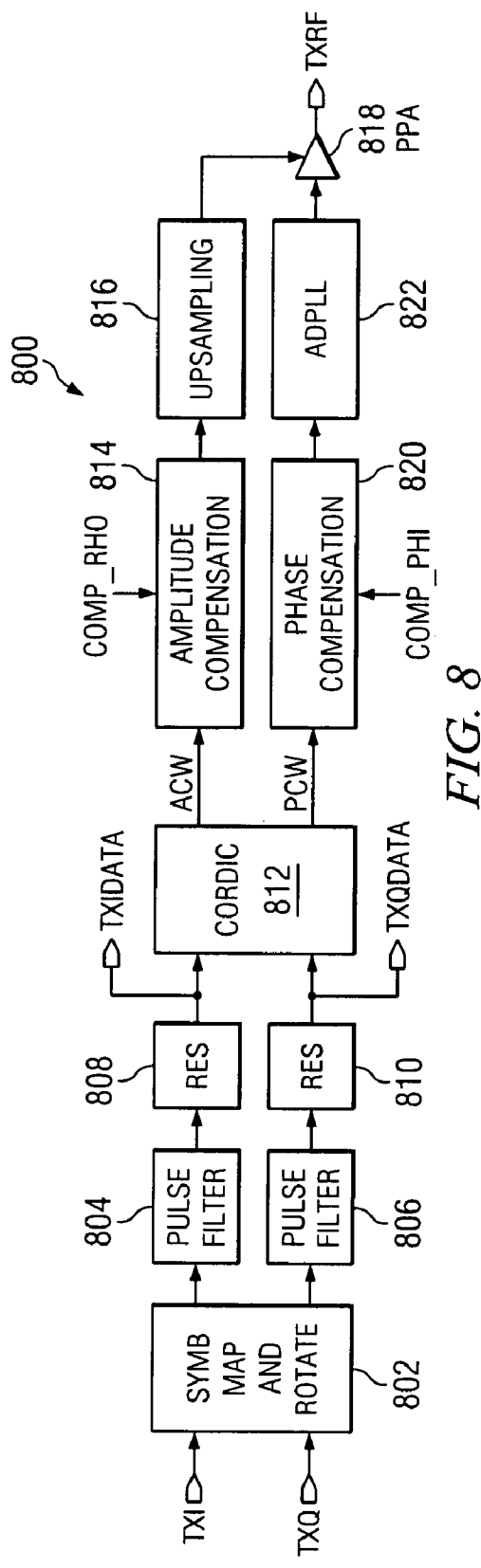
FIG. 8 is a diagram showing the compensation from the receive path applied to the TX signal path.

FIG. 8 shows an example polar transmitter 800 that uses the output of the adaptation and learning block in FIG. 6 to update its output. The baseband TX data (TXI, TXQ) is encoded 802 and passed through pulse shaping filters 804, 806. After resampling 808, 810, it is converted using a CORDIC engine 812, to amplitude control word (ACW) and phase controlled word (PCW). ACW goes through an amplitude compensation block 814, is upsampled, 816 and applied as the amplitude control of a pre-power amplifier 818. The PCW goes through a phase compensation block 820 and is applied to an all-digital phase locked loop 822 whose output is fed to the input of the pre-power amplifier 818. The pre-power amplifier 818 may also represent a power amplifier or a casecade of a pre power amplifier followed by a power amplifier. The amplitude compensation and the phase compensation blocks 814, 820 can be implemented using high order polynomials or look-up tables. The contents of these blocks are updated using the error signal obtained by the adaptation and learning block shown in FIG. 6.

Figure 9:
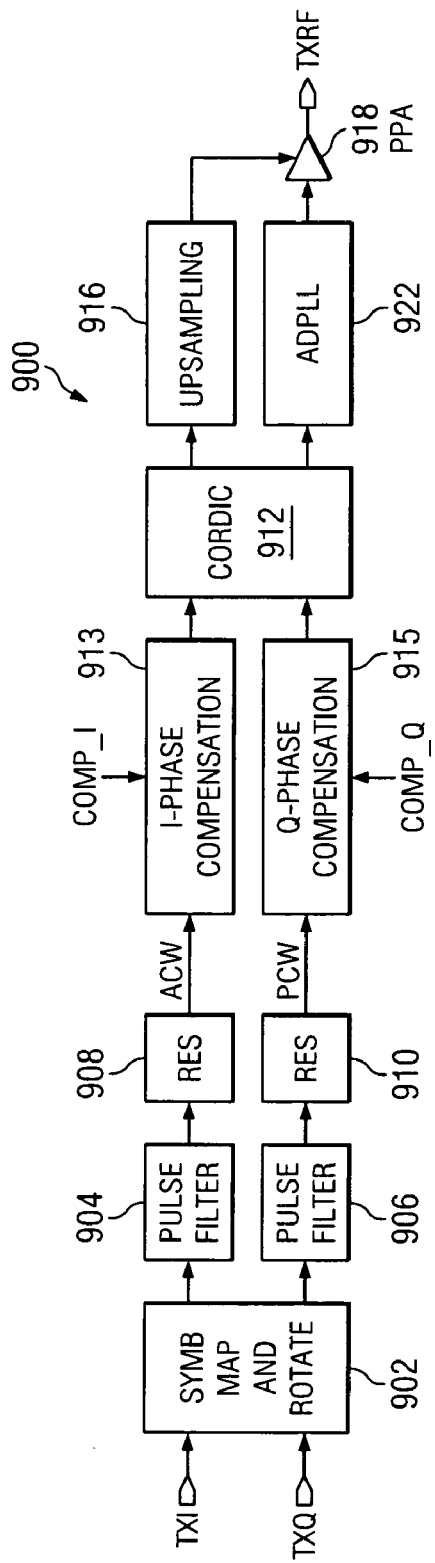
FIG. 9 is a diagram showing a case in which compensation for the transmitter is applied in Cartesian domain, while the transmitter is constructed using a polar approach.

FIG. 9 shows a transmitter 900 in which the compensation for the transmitter is applied in Cartesian domain, while the transmitter is constructed using a polar approach. In FIG. 9, components similar or identical to those described in conjunction with FIG. 8 use similar numbers, but begin with "9" rather than an "8". In this case, the I path and Q path are compensated through I-Phase and Q-Phase compensation blocks 913, 915 that may implement high order polynomials or look-up tables.

Figure 10:
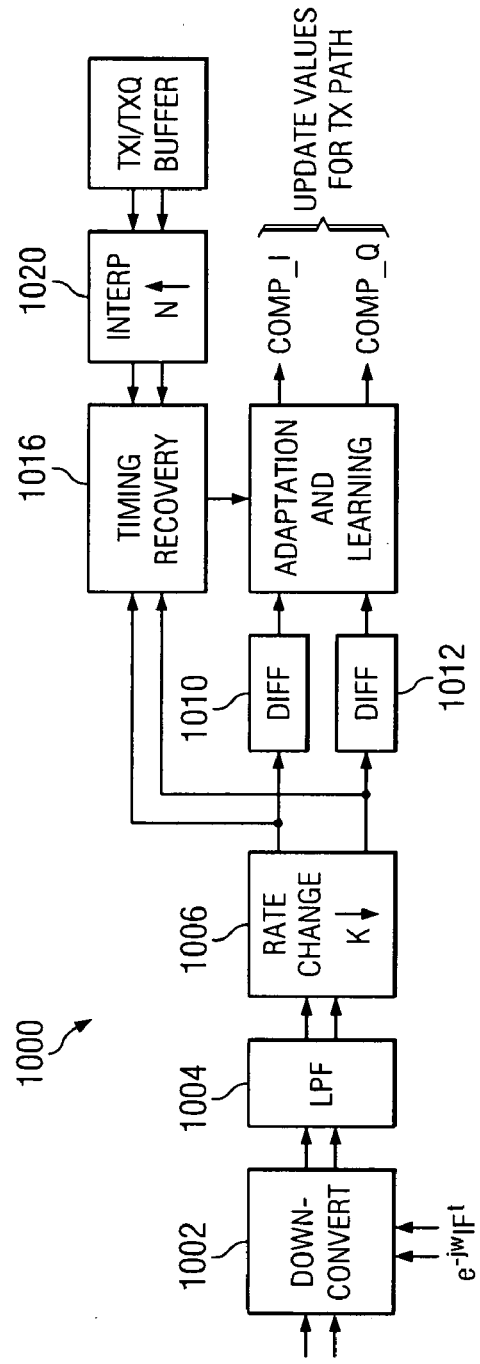
FIG. 10 is a diagram showing the receive path signal processing for the TX feedback signal.

FIG. 10 shows the receive path signal processing for the TX feedback signal. Because the feedback is in Cartesian domain, no CORDIC block is needed in FIG. 10. In FIG. 10, components similar or identical to those described in conjunction with FIG. 9 use similar numbers, but begin with a "10", rather than a "9". The symbol timing recovery block can be implemented to search for correct transmitter data inputs that match the output of the rate change by K block 1006. A complex correlator may be implemented that searches for a training sequence sent out from the transmitter in order to find and compensate for the latency of the loop. The adaptation and learning block 1014 processes the compex I+jQ signal from the receiver and estimates the complex error signal COMP_I+j COMP_Q, that represent the I and Q path compensation values computed by the signal processing path in the receiver.

While the transmitter path can be implemented as a polar or Cartesian transmitter, the auxiliary receive path can process the information needed for feeding back to the transmitter in polar or Cartesian domain. The feedback signal can be used for linearization of the transmitter modulation output or during the power-up ramping or power-down ramping of the power amplifier.

In a half-duplex system, the auxiliary path may not be needed and the main receive path may be deployed during transmission to perform transmitter related functions. In this case, the feedback is achieved by bond-wire coupling between the TX output and the bond-wires of the main receive path LNAs. An intentional coupling may also be placed as shown in FIG. 2, from the antenna port to a coupler that couples part of the TX output power to the LNA input in the main RX path. In this case, the signal processing systems shown in FIG. 7 or FIG. 10 can still be used with minor modifications. Because, the main RX path is no longer processing RX input, the LO seen by the mixer is the same LO that is generated by the TX ADPLL. Hence, the main RX path will down-convert the TX leakage signal to Zero-IF which will go through the main RX path and appear at the output of the main RX path ADCs. The signal processing circuits shown in FIG. 7 or FIG. 10 would need to be added to the RX signal processing circuits needed for the main RX path. The added signal processing circuits will process the TX feedback signal that is now appearing at the main RX path output. No down-conversion is needed so the first block in FIG. 6 or FIG. 7 is not needed. All of the following blocks can be used to obtain error signal that is used to update the compensation applied in the main transmit path.

When using the main RX path, some blocks in the main RX path may not be needed and may be bypassed while powered down to save power consumption.

The receiver may be used for one time calibration only or for update of the compensation tables or polynomials in the main transmit path after significant change in the operating conditions for which the initial compensation tables or polynomials were computed.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A receiver system for use in conjunction with a transceiver having an antenna, a duplexer coupled to the antenna, a transmitter coupled to the duplexer to output a transmit signal at a transmit frequency, and a signal processor coupled to the transmitter and receiver, the receiver system comprising:

a receiver coupled to the duplexer to receive a received signal at a receiver frequency;

an auxiliary receiver tuned to the transmit frequency to process the transmit signal, to produce an auxiliary receiver signal and to couple the auxiliary receiver signal to the signal processor;

a local oscillator producing a local oscillator transmit frequency in-phase (I) channel signal and a local oscillator transmit frequency quadrature (Q) channel signal;

a first mixer having a first input coupled to the local oscillator transmit frequency I-channel signal and a second input coupled to the auxiliary receiver input to output a mixed I-channel signal; and a second mixer having a first input coupled to the local oscillator transmit frequency Q-channel signal and a second input coupled to the auxiliary receiver input to output a mixed Q-channel signal.

2. The receiver system of claim 1 wherein the auxiliary receiver is inductively coupled to the antenna to receive the transmit signal.

3. The receiver system of claim 1 wherein the receiver has a receiver input in communication with the antenna and the auxiliary receiver is coupled to the receiver input.

4. The receiver system of claim 1 further comprising:
an I-channel analog to digital converter having an input to receive the mixed I-channel signal;
an auxiliary I-channel coupled to an output of the I-channel analog to digital converter, the auxiliary I-channel coupled to the signal processor;
a Q-channel analog to digital converter having an input to receive the mixed Q-channel signal; and
an auxiliary Q-channel coupled to an output of the Q-channel analog to digital converter, the auxiliary Q-channel coupled to the signal processor.

5. The receiver system of claim 1 wherein the receiver further includes I-channel and Q-channel analog to digital converters and wherein I-channel and Q-channel analog to digital converters of the receiver and the auxiliary receiver are a single multi-channel analog to digital converter component.

6. The receiver system of claim 1 wherein the receiver includes a receiver I-channel output and a receiver Q-channel output coupled to the signal processor and the auxiliary receiver further comprising a converter which has a first input to receive the mixed I-channel signal and a second input to receive the mixed Q-channel signal, the converter to convert the frequency of the mixed I-channel signal and the mixed Q-channel signal to an intermediate frequency, the converter including a first output coupled to the receiver I-channel output to output the converted I-channel mixed signal and a second output coupled to the receiver Q-channel output to output the converted Q-channel mixed signal.

7. The receiver system of claim 1 wherein the signal processor adjusts the transmit signal based on the auxiliary receiver signal.

8. The receiver system of claim 7 wherein the signal processor determines a distortion function from the auxiliary receiver signal and adjusts the transmit signal by applying an inverse distortion function to linearize the transmit signal.

9. The receiver system of claim 7 wherein the signal processor determines the power of the transmit signal from the auxiliary receiver signal to adjust the power of the transmitter.

10. The receiver system of claim 7 wherein the signal processor controls a boost of the transmit signal based on the auxiliary receiver signal when the power of the transmitter signal is ramped up.

11. The auxiliary receiver system of claim 1 wherein the transmitter, receiver and auxiliary receiver are a single circuit component.

12. A receiver system for use in conjunction with a transceiver having an antenna, a duplexer coupled to the antenna, a transmitter coupled to the duplexer to output a transmit signal at a transmit frequency, and a signal processor coupled to the transmitter and receiver, the receiver system comprising:
a receiver coupled to the duplexer to receive a received signal at a receiver frequency;

an auxiliary receiver tuned to the transmit frequency to process the transmit signal, to produce an auxiliary receiver signal and to couple the auxiliary receiver signal to the signal processor;
wherein the receiver further includes:
a low band input;
a middle band input;
a high band input;
a local oscillator coupled to the low, middle and high band inputs, the local oscillator producing a local oscillator transmitter frequency in-phase (I) channel low band signal, middle band signal and high band signal and a local oscillator transmitter frequency quadrature (Q) channel low band signal, middle band signal and high band signal;
a first mixer having a first input coupled to the low band input and a second output coupled to the local oscillator transmitter frequency I-channel low band signal to output a mixed I-channel low band signal;
a second mixer having a first input coupled to the middle band input and a second output coupled to the local oscillator transmitter frequency I-channel middle band signal to output a mixed I-channel middle band signal;
a third mixer having a first input coupled to the high band input and a second output coupled to the local oscillator transmitter frequency I-channel high band signal to output a mixed I-channel high band signal;
a fourth mixer having a first input coupled to the low band input and a second output coupled to the local oscillator transmitter frequency Q-channel low band signal to output a mixed Q-channel low band signal;
a fifth mixer having a first input coupled to the middle band input and a second output coupled to the local oscillator transmitter frequency Q-channel middle band signal to output a mixed Q-channel middle band signal;
a sixth mixer having a first input coupled to the high band input and a second output coupled to the local oscillator transmitter frequency Q-channel high band signal to output a mixed Q-channel high band signal;
an I-channel analog to digital converter having an input coupled to the outputs of the first, second and third mixers;
an auxiliary receiver I-channel coupled between an output of the I-channel analog to digital converter and the signal processor;
a Q-channel analog to digital converter having an input coupled to the outputs of the first, second and third mixers; and
an auxiliary receiver Q-channel coupled between an output of the Q-channel analog to digital converter and the signal processor.

13. A method of determining transmitter output signals in a transceiver system having a duplex antenna, a transmitter, a receiver and an auxiliary receiver, the method comprising:
coupling the receiver to the duplex antenna to receive a receiver signal at a receiver frequency;
coupling the transmitter to the duplex antenna to transmit a transmitter signal at a transmitter frequency;
tuning the auxiliary receiver to receive the transmitter signal;
modifying the transmitter signal as a function of the received signal from the auxiliary receiver;
mixing the received signal on the auxiliary receiver with a transmitter frequency in-phase(I) channel signal and a transmitter frequency quadrature (Q) channel signal;

sending the mixed transmitter frequency auxiliary receiver I-channel signal to the signal processor via a third channel; and sending the mixed transmitter frequency auxiliary receiver Q-channel signal to the signal processor via a fourth channel.

14. The method of claim 13 further comprising:

determining a distortion function on the transmit signal from the auxiliary receiver signal; and wherein the transmitter signal is modified by applying an inverse distortion function to linearize the transmitter signal.

15. The method of claim 13 further comprising determining the power of the transmitter signal from the signal received by the auxiliary receiver and adjusting the transmitter power.

16. The method of claim 13 wherein modifying the transmitter signal comprises controlling a boost of the transmit signal when the power of the transmitter signal is ramped up.

17. The method of claim 13 further comprising inductively coupling the auxiliary receiver to the duplex antenna to receive the transmitter signal.

18. The method of claim 13 further comprising:

coupling the auxiliary receiver to the receiver to receive the receiver signal; and filtering a bleed signal representing the transmitter signal from the received signal.

19. The method of claim 13 further comprising:

mixing the received signal with a receiver frequency in-phase(I) channel signal and a receiver frequency quadrature (Q) channel signal;

sending the mixed receiver frequency I-channel signal to the signal processor via a first channel; and sending the mixed receiver frequency I-channel signal to the signal processor via a second channel.

20. A method of determining transmitter output signals in a transceiver system having a duplex antenna, a transmitter, a receiver and an auxiliary receiver, the method comprising:

coupling the receiver to the duplex antenna to receive a receiver signal at a receiver frequency;

coupling the transmitter to the duplex antenna to transmit a transmitter signal at a transmitter frequency;

tuning the auxiliary receiver to receive the transmitter signal;

modifying the transmitter signal as a function of the received signal from the auxiliary receiver;

mixing the received signal on the auxiliary receiver with a transmitter frequency in-phase(I) channel signal and a transmitter frequency quadrature (Q) channel signal;

converting the mixed transmitter frequency auxiliary receiver I-channel signal and the mixed transmitter frequency auxiliary receiver Q-channel signal to an intermediate frequency;

sending the converted mixed transmitter frequency auxiliary receiver I-channel signal to the signal processor via the first channel; and sending the converted mixed transmitter frequency auxiliary receiver Q-channel signal to the signal processor via the second channel.

21. A method of determining transmitter output signals in a transceiver system having a duplex antenna, a transmitter, a receiver and an auxiliary receiver, the method comprising:

coupling the receiver to the duplex antenna to receive a receiver signal at a receiver frequency;

coupling the transmitter to the duplex antenna to transmit a transmitter signal at a transmitter frequency;

tuning the auxiliary receiver to receive the transmitter signal;

modifying the transmitter signal as a function of the received signal from the auxiliary receiver;

mixing the received signal on the auxiliary receiver with a transmitter frequency in-phase(I) channel signal and a transmitter frequency quadrature (Q) channel signal;

filtering the received signal into a low band signal, a middle band signal and a high band signal; and filtering the received signal from the auxiliary receiver into a low band signal, a middle band signal and a high band signal.

\* \* \* \* \*